United States Patent [19]
Hanson et al.

[11] Patent Number: 5,999,878
[45] Date of Patent: Dec. 7, 1999

[54] SYSTEM AND METHOD FOR ACQUIRING GEOGRAPHIC DATA FOR FORMING A DIGITAL DATABASE OF ROAD GEOMETRY IN A GEOGRAPHIC REGION

[75] Inventors: John L. Hanson, Des Plaines, Ill.; Robert H. Shotz, Alpharetta, Ga.

[73] Assignee: Navigation Technologies Corp., Rosemont, Ill.

[21] Appl. No.: 08/834,652

[22] Filed: Apr. 11, 1997

[51] Int. Cl.$^6$ .............................. G01S 5/02; G01C 21/00
[52] U.S. Cl. .................. 701/208; 701/215; 342/357.03; 702/5
[58] Field of Search .................................. 701/208, 213, 701/215; 342/357, 457, 357.13, 357.03; 340/990, 995; 702/5

[56] References Cited

U.S. PATENT DOCUMENTS

| | | | |
|---|---|---|---|
| Re. 32,357 | 2/1987 | Nagao et al. | 364/449 |
| 4,428,057 | 1/1984 | Setliff et al. | 364/521 |
| 4,584,646 | 4/1986 | Chan et al. | 364/449 |
| 4,590,569 | 5/1986 | Rogoff et al. | 364/452 |
| 4,731,613 | 3/1988 | Endo et al. | 342/357 |
| 4,743,913 | 5/1988 | Takai | 342/457 |
| 4,751,512 | 6/1988 | Longaker | 342/357 |
| 4,791,572 | 12/1988 | Green, III et al. | 364/449 |
| 4,796,190 | 1/1989 | Cummings | 364/449 |
| 4,814,711 | 3/1989 | Olsen et al. | 324/331 |
| 4,815,012 | 3/1989 | Feintuch | 364/521 |
| 4,891,761 | 1/1990 | Gray et al. | 364/452 |

(List continued on next page.)

OTHER PUBLICATIONS

"3–D Real Time Scanning," ARC News, p. 33, Winter, 1989.
W. Booth, "Weed–Whacking," Wired, pp. 160–164 and 215–216, Oct., 1996.
"Precision Farming's 'Garden' Grows in Midwest," GPS World, two pages, Apr., 1995.
GEO Info Systems, pp. 25–26, Feb., 1997.

*Primary Examiner*—Michael J. Zanelli
*Attorney, Agent, or Firm*—Frank J. Kozak; Lawrence M. Kaplan

[57] ABSTRACT

A system and method for acquiring differentially corrected GPS data for forming a digital database of road geometry in a geographic region. A vehicle having a GPS receiver and a DGPS demodulator located therein is driven on roadways in the geographic region. The GPS receiver receives standard GPS signals and the DGPS demodulator receives DGPS signals which are used to correct the standard GPS signals. The corrected GPS signals are stored where they can be processed to create a digital database. Alternately a GPS receiver is positioned at a stationary location along with a portable DGPS demodulator. A vehicle having a GPS receiver located therein is driven on roadways in the geographic region. The GPS receiver at the stationary location is continuously operated and the DGPS demodulator is operated once to receive a DGPS signal. The DGPS demodulator can then be moved to another geographic region. The GPS receiver in the vehicle is operated as the vehicle is being driven and the GPS receiver receives standard GPS signals. The standard GPS signals from the GPS receiver at the stationary location can be used to correct the standard GPS signals received by the GPS receiver in the vehicle.

43 Claims, 7 Drawing Sheets

U.S. PATENT DOCUMENTS

| | | | |
|---|---|---|---|
| 4,982,332 | 1/1991 | Saito et al. | 364/449 |
| 4,994,974 | 2/1991 | Cummings | 364/443 |
| 5,214,757 | 5/1993 | Mauney et al. | 395/161 |
| 5,467,282 | 11/1995 | Dennis | 364/449 |
| 5,470,233 | 11/1995 | Fruchterman et al. | 434/112 |
| 5,510,798 | 4/1996 | Bauer | 342/357 |
| 5,517,419 | 5/1996 | Lanckton et al. | 364/449 |
| 5,523,761 | 6/1996 | Gildea | 342/357 |
| 5,528,518 | 6/1996 | Bradshaw et al. | 364/561 |
| 5,539,645 | 7/1996 | Mandhyan et al. | 364/438 |
| 5,557,524 | 9/1996 | Maki | 364/424.04 |
| 5,563,607 | 10/1996 | Loomis et al. | 342/357 |
| 5,563,786 | 10/1996 | Torii | 364/424.02 |
| 5,587,715 | 12/1996 | Lewis | 342/357 |
| 5,589,835 | 12/1996 | Gildea et al. | 342/357 |
| 5,680,140 | 10/1997 | Loomis | 342/357 |
| 5,699,244 | 12/1997 | Clark, Jr. et al. | 364/420 |
| 5,760,742 | 6/1998 | Branch et al. | 342/457 |
| 5,764,184 | 6/1998 | Hatch et al. | 342/357 |
| 5,852,790 | 12/1998 | Hayes et al. | 701/213 |
| 5,870,689 | 2/1999 | Hale et al. | 702/5 |
| 5,928,306 | 7/1999 | France et al. | 701/207 |

| LAT | LONG | TIME | ALT |
|---|---|---|---|
| $LAT_1$ | $LONG_1$ | $TIME_1$ | $ALT_1$ |
| $LAT_2$ | $LONG_2$ | $TIME_2$ | $ALT_2$ |
| ⋮ | ⋮ | ⋮ | ⋮ |
| $LAT_n$ | $LONG_n$ | $TIME_n$ | $ALT_n$ |

SYSTEM AND METHOD FOR ACQUIRING GEOGRAPHIC DATA FOR FORMING A DIGITAL DATABASE OF ROAD GEOMETRY IN A GEOGRAPHIC REGION

FIELD OF THE INVENTION

The present invention relates to digital databases useful in navigation systems and, in particular, the present invention relates to a system and method for acquiring differentially corrected GPS data for forming a digital database of road geometry in a geographic region.

BACKGROUND OF THE INVENTION

Computer-based navigation systems for use on land have become available in a variety of forms and provide a variety of useful features.

One exemplary type of navigation system uses (1) a detailed data set of one or more geographic areas or regions, (2) a navigation application program, (3) appropriate computer hardware, such as a microprocessor, memory, and storage, and optionally, (4) a positioning system. The detailed geographic data set portion of the navigation system is in the form of one or more detailed, organized data files or databases. The detailed geographic data set may include information about the positions of roads and intersections in or related to one or more specific geographic regional areas, and may also include information about one-way streets, turn restrictions, street addresses, alternative routes, hotels, restaurants, museums, stadiums, offices, automobile dealerships, auto repair shops, etc.

The positioning system may employ any of several well-known technologies to determine or approximate one's physical location in a geographic regional area. For example, the positioning system may employ a GPS-type system (global positioning system), a "dead reckoning"-type system, or combinations of these, or other systems, all of which are well-known in the art.

The navigation application program portion of the navigation system is a software program that uses the detailed geographic data set and the positioning system (when employed). The navigation application program may provide the user with a graphical display (e.g. a "map") of the user's specific location in the geographic area. In addition, the navigation application program may also provide the user with specific directions to locations in the geographic area from wherever the user is located.

Some navigation systems combine the navigation application program, geographic data set, and optionally, the positioning system in a single unit. Such single unit systems can be installed in vehicles or carried by persons. Alternatively, navigation application programs and geographic datasets may be provided as software products that are sold or licensed to users to load in their own personal computers. In further alternatives, the navigation system may be centrally or regionally located and accessible to multiple users on an "as needed" basis, or alternatively, on-line via a network or communications link. Personal computer-based systems may be stand-alone systems or may utilize a communication link to a central or regional or distributed system. Also, users may access a navigation system over an online service such as the Internet, or over private dial-up services, such as CompuServe, Prodigy, and America Online. In-vehicle navigation systems may use wireless communication connections. Navigation systems may also be used by operators of vehicle fleets such as trucking companies, package delivery services, and so on. Navigation systems may also be used by entities concerned with traffic control or traffic monitoring.

Computer-based navigation systems hold the promise of providing high levels of navigation assistance to users. Navigation systems can provide detailed instructions for traveling to desired destinations, thereby reducing travel times and expenses. Navigation systems also can provide enhanced navigation features such as helping commuters and travelers avoid construction delays and finding the quickest routes to desired destinations. Navigation systems can also be used to incorporate real-time traffic information.

In order to provide these useful and enhanced features in a navigation system, there is a need to gather and organize comprehensive, detailed, reliable, and up-to-date data about geographical regions and areas. There is also a need to continuously update the geographic data since many data can rapidly become out-of-date. Presently, the collection of such geographic data and the provision of such data in a computer-usable format are provided by Navigation Technologies of Sunnyvale, Calif.

One known way to generate a digital database of road geometry in a geographic region is to obtain an aerial photograph of the geographic region. A technician, using a digitizing pad or other suitable input device, selects points from the aerial photograph to create "nodes." Two nodes are connected by a segment where the segment represents the portion of the road between two nodes. Nodes may be positioned at intersections or at the ends of a roadway, for example. A disadvantage with this method is the relatively high cost of obtaining aerial photographs especially in geographic regions where there is not much road geometry. A further disadvantage is the cost of labor and equipment to digitize the aerial photographs.

Alternatively, under certain limited circumstances, as explained below, the Global Positioning System (GPS) may be used to gather such geographic data. By way of background, the Global Positioning System was developed by the U.S. Government in order for the military to have a precise form of worldwide positioning for maneuvering, navigation, targeting, and so on. The GPS is now used for many non-military purposes including navigation on land, sea, and in the air.

A GPS receiver acquires GPS signals sent from a plurality (e.g., "a constellation") of satellites. GPS uses the satellites in space as reference points for locations on earth. The basis of GPS is triangulation from a plurality of satellites. By accurately measuring the receiver's distance from each satellite in the constellation, one can triangulate the receiver's position anywhere on earth. To triangulate, a GPS receiver located on earth measures the distance of the receiver from each of the satellites of a constellation using the travel times of radio signals from each of the satellites.

In order to prevent civilians from using the same data to set artillery or home an unmanned ammunition to a target with optimum precision, the government intentionally induces an error (called selective availability (SA)) ranging from 0 to about 100 meters into the signals transmitted by the satellites. Military receivers are not affected by SA because they have access to a decryption key to remove the SA errors.

In order to correct for the error induced by SA, a process called differential correction was developed. In general terms differential correction or DGPS is based upon the principal that if standard GPS signals indicate where one is within 100 meters and one knows there is a random, dynamic error induced in the GPS signals received, the first step to solving this algebraic unknown is to establish a base or a known position. For example if a surveyed site has the coordinates (N. 39 00' 00" W. 120 00' 00") and a standard GPS signal is recorded at that surveyed site and has the coordinates (N. 39 00' 02" W 120 00' 00"), a difference of 2" (about 202 feet or 67 meters) to the north exists between the true location and the detected location. If one were receiving the same GPS signal at the same time at a different relatively nearby site, a correction of the coordinates 67 meters to the south removes the induced error and provides a corrected geographic position.

An automobile equipped with a GPS receiver and antenna can be used to collect geographic data in a geographic region. As the vehicle is driven on a roadway in the geographic region, the GPS receiver is operated. The GPS signals are stored as standard GPS data in memory and later transmitted to a remote site where the standard GPS data is further processed. Correction data may be provided by a reference GPS receiver located at a known, surveyed site, i.e., a base station. The roving GPS receiver, i.e., the GPS receiver in the vehicle, records all of the GPS signals it receives and the time each signal is received. The base station calculates and stores correction data for the GPS signals the base station receives and creates a correction data file. The standard GPS data are post processed with the correction data to obtain corrected GPS data. There are several disadvantages, however, with this method. These include the cost of supplying and maintaining a base station, and if the base station is provided by a third party, a compromise in reliability may be introduced since the third party may not be acquiring corrections for GPS signals at the same periods of time, or intervals of time within those periods, as the roving receiver. Also the distance that the roving receiver may be from the base station is limited to about 300 miles. At present time, still less than about 30% of the U.S. is covered within the range of base stations. Also, this method requires post processing of the data gathered by the roving receiver which does not allow for precise positioning in real time and introduces delay in the availability of the geographic information gathered by the GPS receiver.

Thus, it is desirable to provide a system and method for acquiring data for creating a digital database of road geometry in a geographic region wherein the GPS signals may be differentially corrected. It is also desirable to provide a system and method that provides more reliability and a greater area of coverage than the method relying upon base stations.

SUMMARY OF THE INVENTION

According to a first aspect of the invention there is provided a system for acquiring data for forming a digital database of road geometry in a geographic region. The system includes a land-based vehicle for traveling on roads, a receiver mounted in the land-based vehicle, and a demodulator mounted in the land-based vehicle and coupled to the receiver. The receiver, when operated during a data gathering sequence, acquires Global Position System (GPS) signals transmitted from a plurality of satellites. The demodulator receives differential global position system (DGPS) signals from a differential global position system when the demodulator is operated during the data gathering sequence, so that each GPS signal is corrected by a DGPS signal to create differentially corrected GPS data. A memory stores each of the corrected GPS data.

According to a second aspect of the invention there is provided a system for acquiring data for forming a digital database of road geometry in a geographic region using a land-based vehicle equipped to receive Global Position System (GPS) signals while the vehicle is driven on roads in the geographic region. The system includes means for receiving a differential global position system (DGPS) signal located in the land-based vehicle, means for correcting the GPS signal with the DGPS signal to provide corrected geographic position data, and a storage device for continuously storing the corrected geographic position data.

According to a third aspect of the invention there is provided a system for acquiring data for forming a digital database of pathway geometry in a geographic region. The system includes a vehicle for traveling along pathways in the geographic region of interest, a receiver mounted in the vehicle wherein the receiver, when operated during a data gathering sequence, acquires Global Position System (GPS) signals transmitted from a plurality of satellites, a demodulator mounted in the vehicle and coupled to the receiver wherein the demodulator receives a differential global position system (DGPS) signal from a differential global position system when the demodulator is operated during the data gathering sequence, wherein each GPS signal is corrected by a DGPS signal to generate differentially corrected GPS data, and a memory that stores each of the differentially corrected GPS data.

According to a fourth aspect of the invention there is provided a method for acquiring data for forming a digital database of road geometry in a geographic region. The method includes the steps of providing a GPS receiver and a DGPS demodulator coupled to the GPS receiver onboard a land-based vehicle, driving the vehicle on a road in the geographic region; and operating the GPS receiver and DGPS demodulator while traversing the road in the geographic region with the vehicle.

According to a fifth aspect of the present invention there is provided a method of acquiring data for developing a digital database of roadway geometry for roadways and intersections in a selected geographic region. The method includes the steps of moving a portable DGPS unit to at least one position in said selected geographic region, operating said portable DGPS unit in conjunction with at least one standard GPS unit to acquire first data indicative of a precise position of said portable DGPS unit in said selected geographic region during a first period of time, driving a mobile vehicle on roadways in said selected geographic region, during a second period of time, operating a standard GPS unit located in said mobile vehicle to obtain second data indicative of positions of said mobile vehicle on the roadways during said step of driving, using said first data to correct said second data to obtain third data indicative of precise positions of said mobile vehicle on said roadways, whereby said third data are used to develop a digital database of roadway geometry including roadways and intersections for said selected geographic region.

According to a sixth aspect of the present invention there is provided a system for acquiring geographic data for forming a digital database of road geometry in a geographic region. The system includes a land-based vehicle for traveling on roads, a receiver mounted in the land-based vehicle wherein the receiver, when operated during a data gathering sequence, acquires Global Position System (GPS) signals transmitted from a plurality of satellites, a demodulator for receiving at least one differential global position system (DGPS) signal from a differential global position system wherein each GPS signal is corrected by the at least one DGPS signal to create differentially corrected GPS data, a memory that stores each of the corrected GPS data, and a computer for generating the digital database from the corrected GPS data.

According to a seventh aspect of the present invention there is provided a method for acquiring data for forming a digital database of road geometry in a geographic region. The method includes the steps of receiving at least one Differential Global Position (DGPS) signal with a demodulator, receiving a plurality of Global Position System (GPS) signals with a receiver, generating differentially corrected GPS data by correcting the received GPS signals with the at least one DGPS signal, storing the corrected GPS data in memory, and using the stored corrected GPS data to create the digital database.

DETAILED DESCRIPTION OF THE PRESENTLY PREFERRED EMBODIMENTS

First Embodiment

Figure 1:
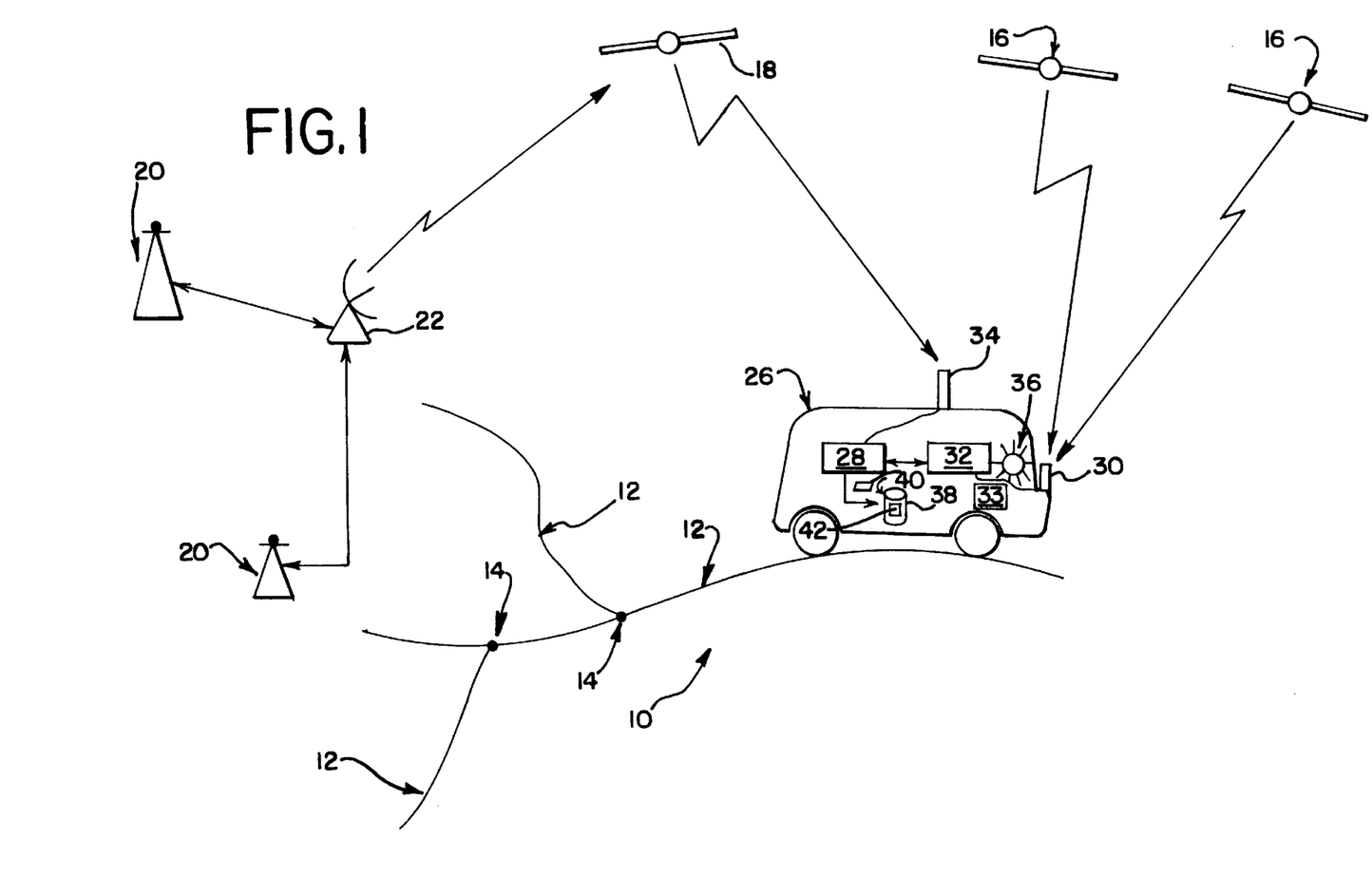
FIG. 1 is a schematic illustration of a method and system according to an embodiment of the present invention.

FIG. 1 is a schematic illustration of a method and system according to an embodiment of the present invention for acquiring differentially corrected GPS data in real-time for forming a digital database of road geometry in a geographic region. In FIG. 1 a geographic region 10 includes a plurality of roads 12 and intersections 14. The region 10 is located such that it is possible to obtain standard GPS signals at most places in the region 10 from a constellation of GPS satellites 16. Further, in at least some and preferably most places in the region 10 it is possible to obtain DGPS correction signals from a DGPS satellite 18. The DGPS correction signals may be obtained from conventional, commercially-available sources. In one present embodiment John E. Chance & Associates, Inc. of Houston, Tex. commercially provides DGPS correction signals with its Omnistar™ DGPS. The Omnistar™ system has base stations 20 scattered at known sites on the coastal edge of the U.S. and a private geostationary satellite 18. The base stations 20 provide DGPS correction signals to satellite 18 through an uplink 22 and the satellite 18 transmits the DGPS correction signals to earth.

In this embodiment, an on-road land-based vehicle 26 such as an automobile is located in the geographic region 10 and is equipped with a receiver 28 for receiving GPS signals ("a GPS receiver"), a GPS antenna 34, a demodulator 32 for receiving differentially corrected GPS signals ("a DGPS demodulator") and a DGPS antenna 30. The vehicle is also provided with an indicator 36 coupled to the demodulator 32 and a suitable computer readable medium 38 coupled to the receiver 28. The GPS receiver 28 and DGPS demodulator 32 are coupled together so that each may communicate with the other. The land-based vehicle 26, equipped as shown, is used to acquire GPS data which will be differentially corrected in real-time and used to create a digital database of road geometry as the vehicle 26 is driven on road 12 in the geographic region 10. As the vehicle 26 is driven in the region 10, the GPS receiver 28 and DGPS demodulator 32 are turned on so that the GPS receiver 28 receives GPS signals from the GPS satellites 16 through antenna 34 and the DGPS demodulator 32 receives DGPS signals from satellite 18 through antenna 30.

In this embodiment, the vehicle 26 may be equipped with a GPS ProXL system available from Trimble Navigation Limited of Sunnyvale, Calif., and a DGPS demodulator, Omnistar™ Model 6300A available from John E. Chance & Associates, Inc. of Houston, Tex. While the GPS receiver 28 and DGPS demodulator 32 are illustrated as separate units, they may alternatively be combined as one unit, for example, by using Omnistar's Model 6300A-G which includes its own GPS receiver.

Figure 2:
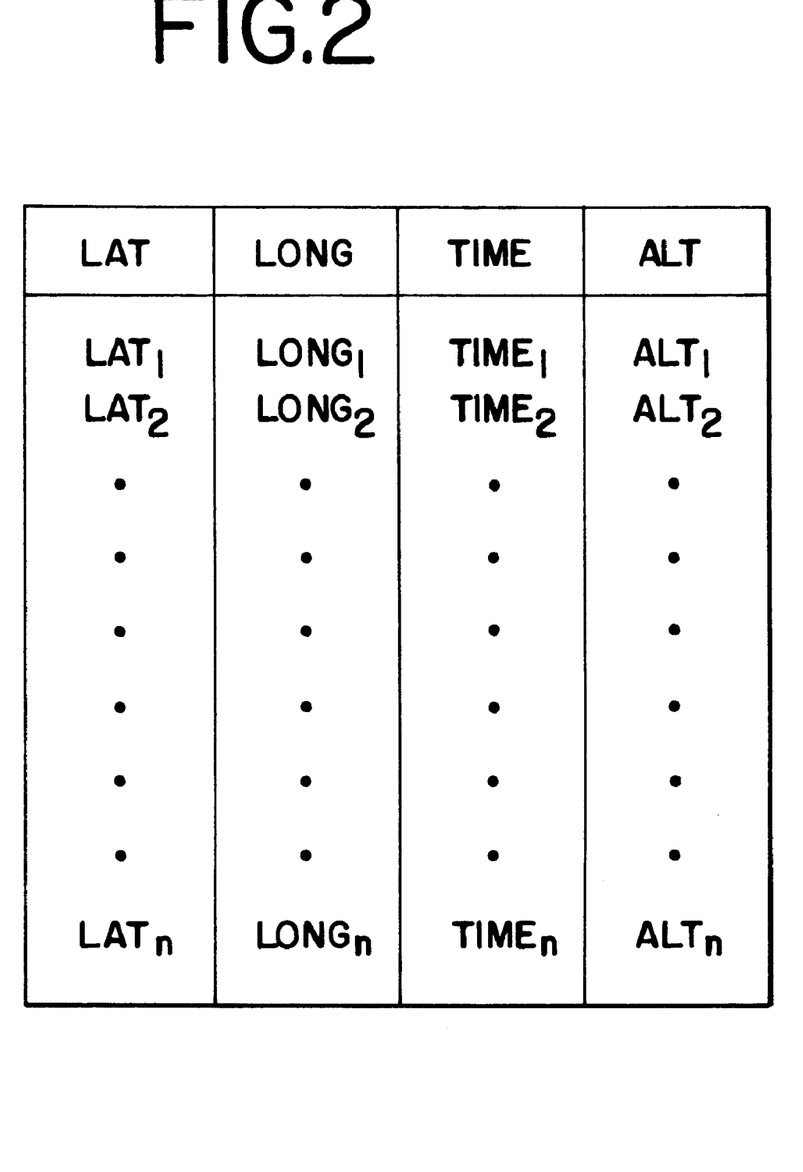
FIG. 2 illustrates an example of the differentially corrected GPS data stored in a file.

The receiver 28 and the demodulator 32 are both operated while the vehicle 26 is driven on roads 12 in the region 10. The GPS receiver 28 obtains standard GPS data as it receives the GPS signals from satellite 16. The standard GPS data indicates geographic locations of the vehicle 26 on the roads 12 (and also indicative of the locations of the roads 12 since the vehicle 26 is driven on the roads as the data is collected) as the vehicle 26 is driven in the geographic region 10. The standard GPS data, however, is not indicative of the precise geographic position of the vehicle 26 because of the random errors that are intentionally induced in standard GPS signals. The receiver 28 communicates its position, i.e. the standard GPS data, to the demodulator 32 which corrects the standard GPS data with the DGPS correction signals supplied by the demodulator 32 to create corrected GPS data 40 which is stored in a suitable computer readable file 42 as an ASCII file in the computer readable medium 38 coupled to the GPS receiver 28. FIG. 2 illustrates an example of the differentially corrected GPS data stored in file 42.

In a preferred embodiment, a computer 33, such as a laptop, is also provided in the vehicle 26 and the corrected GPS data stored in file 42 can be downloaded to the laptop's memory and stored therein until further processing as will be described hereinafter.

Due to space limitations in the vehicle, the GPS receiver and DGPS demodulator are preferably mounted in the trunk of the vehicle along with separate power supplies. The Omnistar DGPS demodulator has a display on the face of the unit that indicates that DGPS information is being received. When the DGPS demodulator is mounted in the trunk of the vehicle, such indicator display is out of view. Thus, it may be necessary to provide an indicator to the driver of the vehicle in a simple manner. To that end, indicator 36 preferably in the form of an LED may be provided on the dashboard of the vehicle. The indicator 36 illuminates whenever the DGPS demodulator 32 is receiving DGPS signals. This allows the driver to keep his or her eyes forward on the road while visually confirming the reception of DGPS signals. Also, two switches (not shown) are provided on the dashboard for the driver to turn on and off the GPS receiver 28 and DGPS demodulator 32 respectively without having to access the receiver and demodulator in the trunk.

Figure 3:
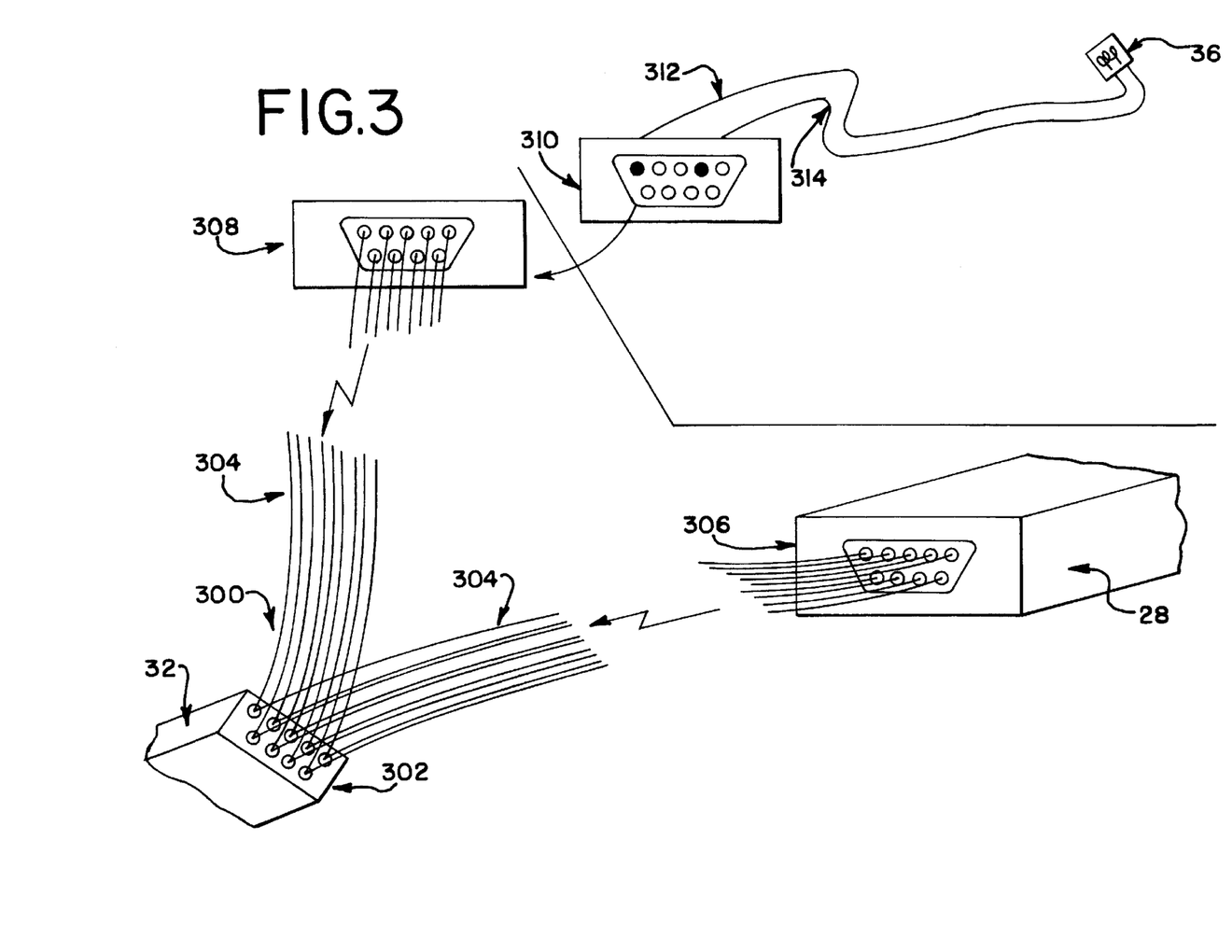
FIG. 3 illustrates schematically the electrical connections between the DGPS demodulator, the GPS receiver and the indicator.

FIG. 3 illustrates schematically the electrical connections between the DGPS demodulator 32, the GPS receiver 28 and the indicator 36 located on the dashboard of the vehicle. In particular, a Y adapter 300 having a 9 pin female connector 302 and two 9 conductor ribbon cables 304 attached thereto are connected to the RTCM OUT port located on the back panel of the DGPS demodulator 32. One ribbon cable 304 is terminated by a 9 pin male connector 306 connected to the RTCM OUT port located on the back of the GPS receiver 28. The other ribbon cable 304 terminates in a 9 pin male connector 308 connected to a 9 pin female connector 310. Two conductors 312 and 314 are soldered to pins 2 and 5 of the female connector 310 and connected to the indicator 36 mounted on the dashboard of the vehicle. In a preferred embodiment, conductor 312 carries the signal that DGPS signals are being received by the DGPS demodulator and conductor 314 carries signal ground.

To create a digital database of the road geometry, the differentially corrected GPS data stored in file 42 are transmitted to a remote site where the data is further processed. In a preferred embodiment, the stored differentially corrected GPS data are transferred to a remote site preferably using a file transfer protocol (FTP) software which compresses the data and allows it to be transmitted quickly. The data may alternatively be sent to the remote site by e-mail or on a floppy disk, for example. At the remote site, the data is converted to an ARC/INFO format using Environmental Systems Research Institute's software program. Once the conversion to ARC/INFO has been made, a data-technician can call up a graphical representation of the data on a workstation.

Figure 4:
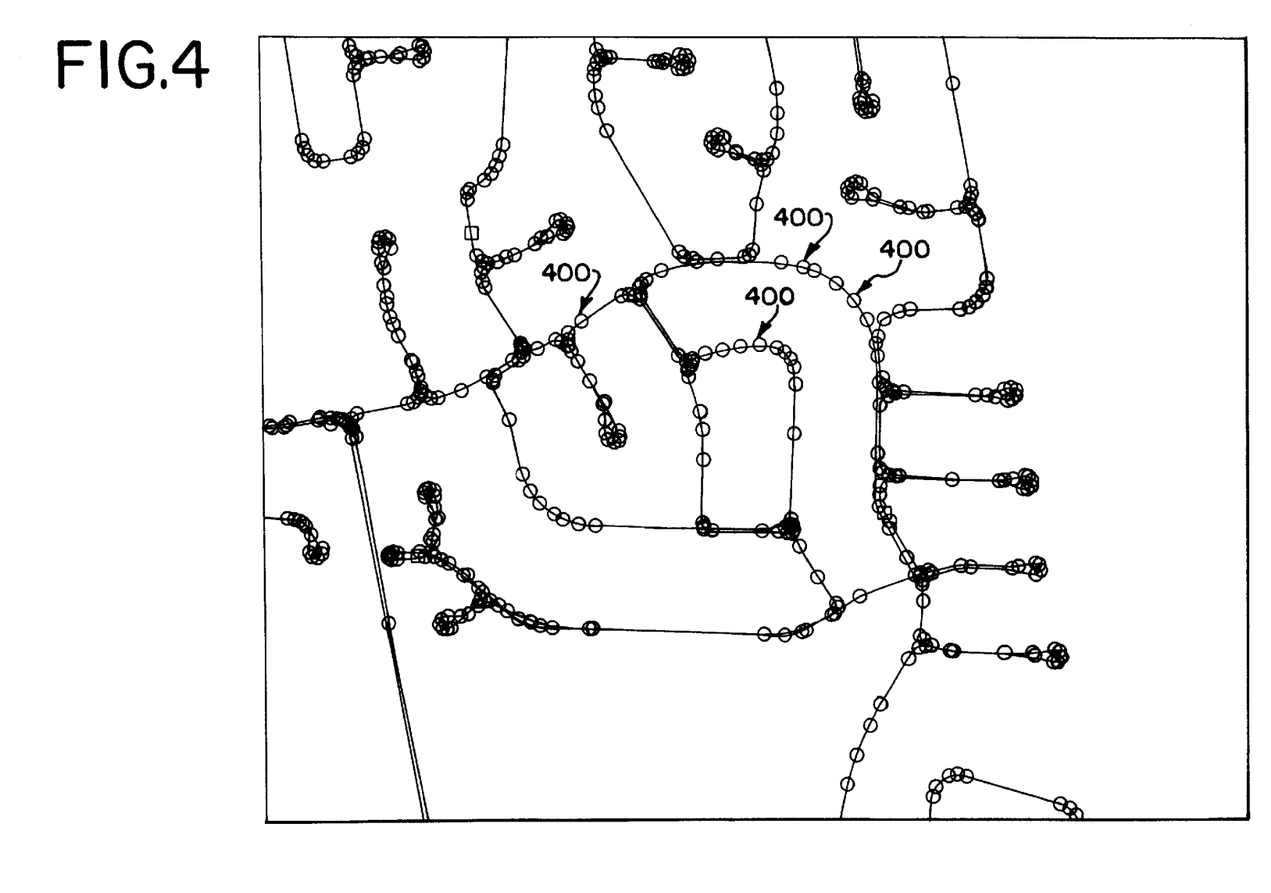
FIG. 4 illustrates the graphical representation of the differentially corrected GPS data.
Figure 5:
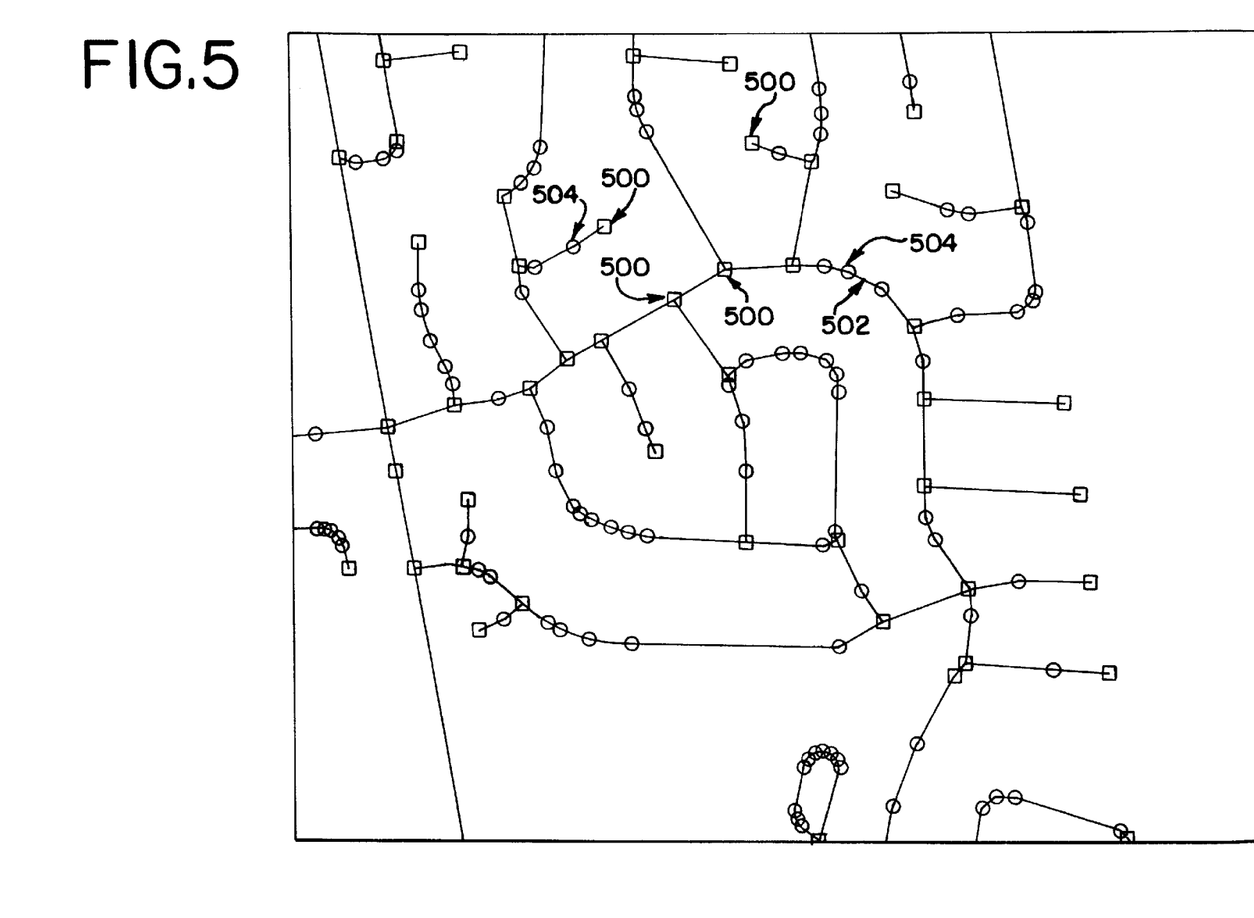
FIG. 5 illustrates the graphical representation of nodes, segments and shape points.

FIG. 4 illustrates the graphical representation of the differentially corrected GPS data displaying the portion of region 10 covered by the vehicle. In particular, a plurality of circles 400 represent the differentially corrected GPS data collected. The datapoints 400 are connected by lines according to the time each signal was received. From this graphical representation the data technician selects points on the display shown in FIG. 4 which will be designated as nodes which will become part of the digital database. As mentioned above, in a digital database of roadway geometry, a node represents a geographic endpoint of a segment. A segment, in turn, represents a portion of road between two nodes. Thus, each segment has a node at each end. The user can also designate shape points 504 (see FIG. 5). Shape points 504 are used to approximate the curvature of a segment between two nodes by requiring the segment to intersect the shape points as it extends between its endpoint nodes, as illustrated at segment 502 (FIG. 5). FIG. 5 illustrates the display of the digital database where the nodes are indicated as square boxes 500, the segments are lines 502 and the shape points are circles 504.

An advantage of using the Omnistar™ DGPS as part of the process of acquiring DGPS data, is that it provides extensive coverage (all 48 states, half of Canada, Mexico, Alaska along with portions of Belize and Guatemala). Also, the DGPS correction signals are real time, thereby eliminating post processing of the GPS data and the delay associated therewith.

Second Embodiment

Figure 6:
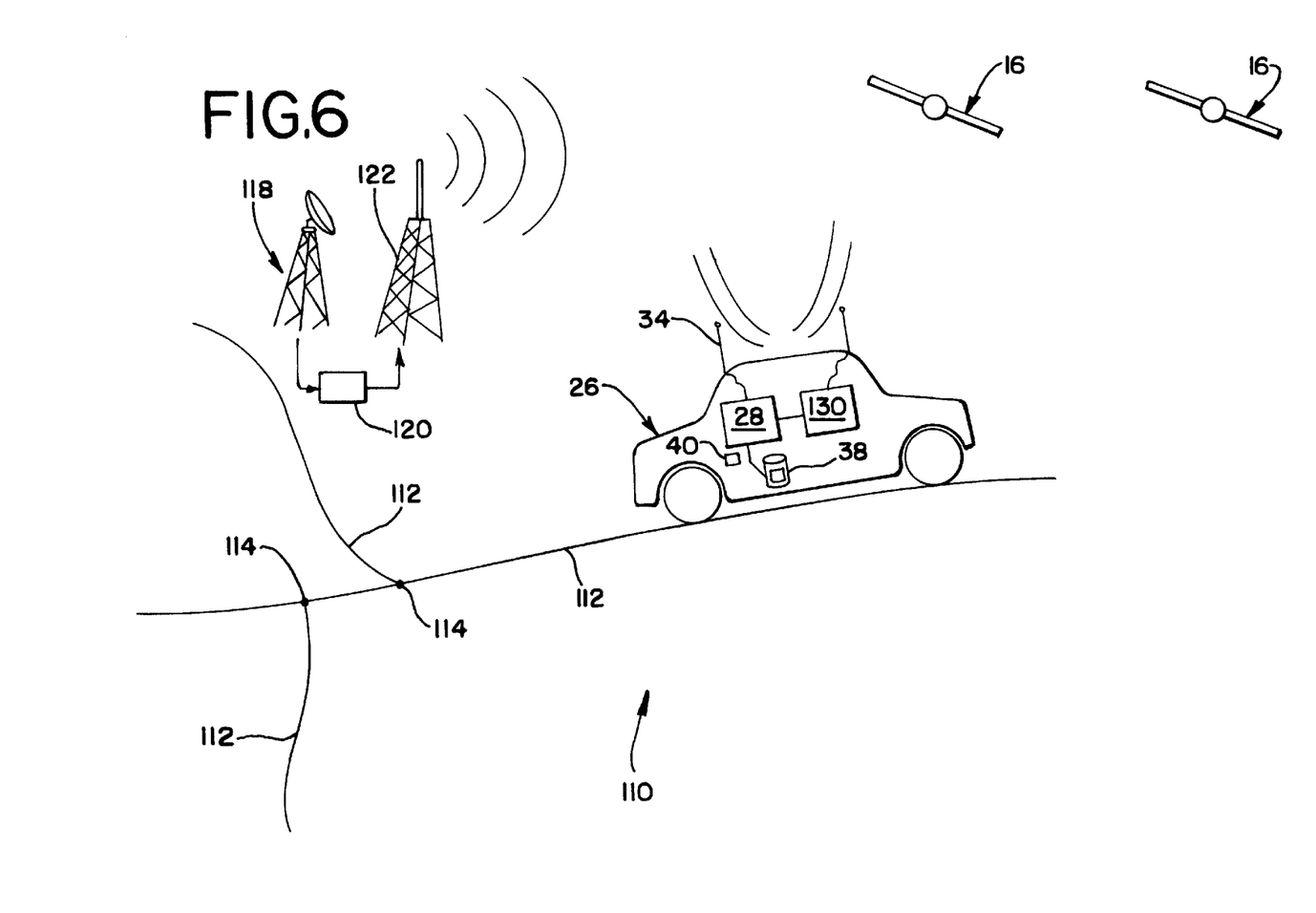
FIG. 6 is a schematic illustration of a method and system according to an embodiment of the present invention.

Another embodiment of the invention is illustrated in FIG. 6. Portions of this embodiment are similar to the first embodiment and like components are represented by the same numerals.

In the embodiment of FIG. 6, a geographic area 110 includes roads 112 and intersections 114. Located in the geographic area 110 is an established DGPS base station 118. The base station 118 includes a receiver that is adapted to receive GPS signals from a constellation of satellites 16. The base station 118 is at a known surveyed site so that its precise position is known. As the base station 118 receives GPS signals from the constellation of satellites 16, an appropriate computing means 120 compares the actual known position of the base station 118 to a position of the base station derived from the GPS signals received from the constellation of satellites. Since the signals from the constellation of satellites include induced errors, the induced errors can be determined by the computing means by a comparison of the actual position of the base station to its calculated position. Corrections can then be calculated. The corrections are continuously calculated and values for the calculated corrections (Pseudo Range Corrections) are then continuously transmitted via a broadcast transmitter 122. In a preferred embodiment, the transmitter 122 is an FM transmitter.

A vehicle 26 is driven on the roads 112 in the geographic area 100. The vehicle is equipped with a GPS receiver 28, as in the first embodiment. The vehicle 26 is also equipped with a receiver 130, which is adapted to receive the signals broadcast from the transmitter 122. Using the corrections included in the signals from the transmitter, corrected positions for the vehicle 26 as it is being driven on the roads 112 in the region 100 can be determined as in the first embodiment. Using the corrected positions for the vehicle, a digital database of the roadway geometry in the region can be determined.

This embodiment can be used in a geographic areas in which an established base station broadcasts DGPS correction signals on a relatively continuous basis. The size of the geographic area that can be mapped in this manner is limited by the range of transmission of the FM transmitter. In addition, it is preferable that the distance from vehicle to the base station be limited so that the constellation of satellites for which the corrections are being broadcast by the transmitter 122 includes the same constellation of satellites used by the GPS receiver 28 in the vehicle 26. Further, it is preferable to limit the size of the geographic region 110 since the accuracy of using DGPS to calculate corrections at a roving vehicle diminishes at distances away from the base station.

Differential Corrections, Inc. (DCI) of Cupertino, Calif. is a provider of DGPS corrections. DCI broadcasts data over a network of FM radio stations. An advantage of DCI's system is the cost for their service (about $600 a year).

Third Embodiment

Figure 7:
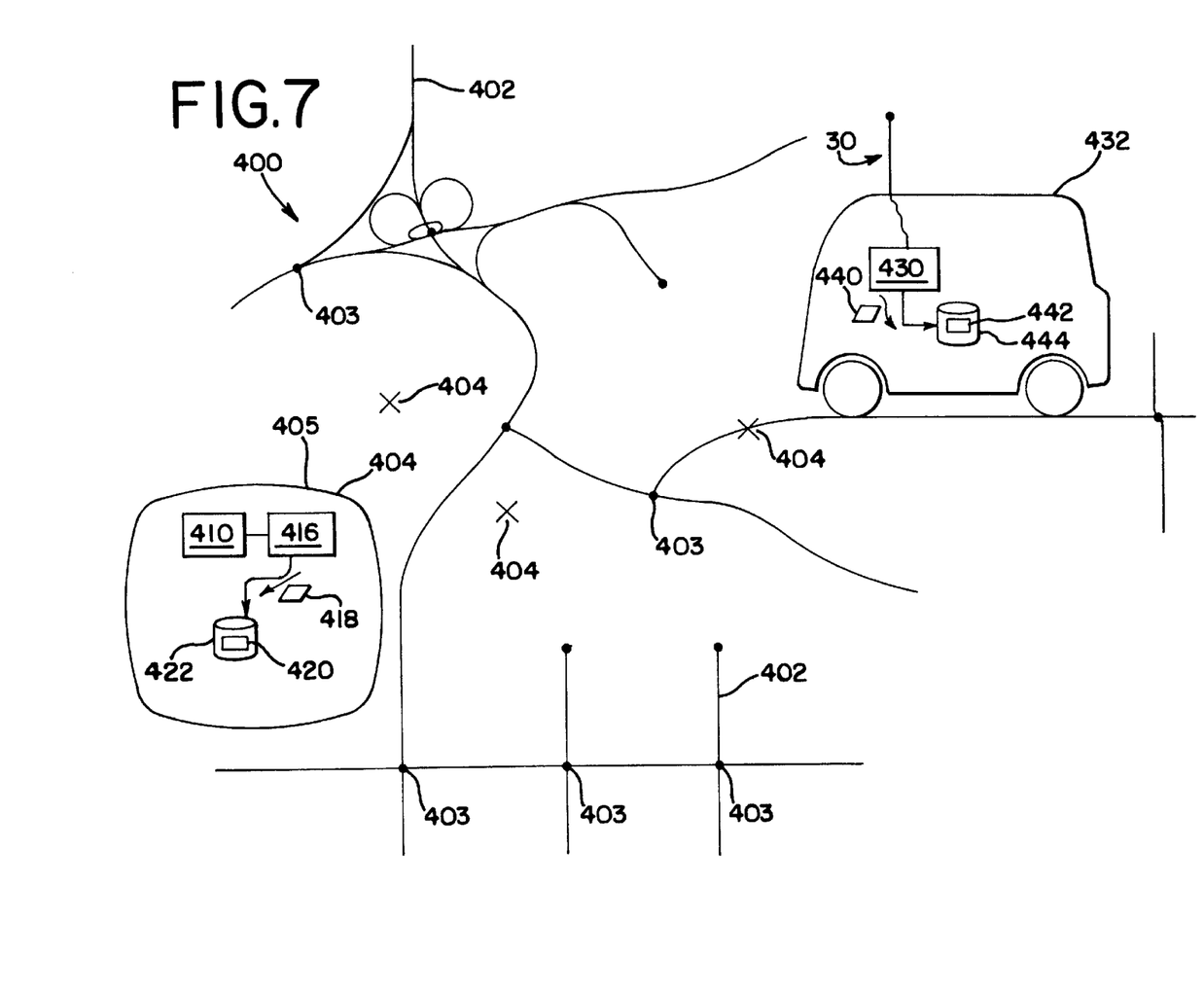
FIG. 7 is a schematic illustration of a method and system according to an embodiment of the present invention.

Another embodiment is shown in FIG. 7. In FIG. 7 a geographic region 400 includes a plurality of roads 402 and intersections 403. The geographic region 400 has a size such that a radius from approximately the center of the region 400 to an outer edge is less than approximately 100 miles. In addition, the region 400 is located such that it is possible to obtain standard GPS signals at most places in the region 400. Further, in at least some places 404 in the region 400, and in particular in at least portions of the region not more than approximately 100 miles from all other places in the region 400, it is possible to obtain DGPS correction signals. In this embodiment, some or all of the region 400 may be more than approximately 100 miles from an existing DGPS base station.

According to this embodiment, a DGPS unit 410 is moved into the region 400. In particular, the DGPS unit 410 is moved to a location 405 which is one of the places 404 in the region where it is possible to obtain DGPS correction signals. In a preferred embodiment, the DGPS unit 410 is a portable unit and is temporarily moved into the location 405 in the region 400. Located with the DGPS unit 410 is a first standard GPS unit 416. The DGPS unit 410 and the first standard GPS unit 416 are coupled together, in the manner described above, so that the geographic position of the location 405 can be obtained with relatively high precision.

In a preferred embodiment, the geographic position of the location 405 is determined within no more than approximately ±15 meters and, more preferably, the position can be determined within approximately ±5 meters, and most preferably within approximately ±3 meters. In a present embodiment, the DGPS unit 410 and the first standard GPS unit 416 are located in a relatively secure location, such as a vehicle or a motel room.

After the coupled DGPS unit 410 and GPS unit 416 are used to determine the differentially corrected position of the GPS unit 416, the DGPS unit 410 may be removed or shut off, and then the first standard GPS unit 416 is continued to be operated at the location 405 for a period of time to obtain first standard GPS data 418. The period of time may be any suitable period of time, such as continuously for 10 hours. The first standard GPS data 418 indicate the geographic position of the location 405; however, these data 418 are not indicative of the precise geographic position of the location 405 because of the random errors that are intentionally induced in standard GPS signals. The first GPS unit 416 may be operated automatically, i.e. without manual intervention. The standard GPS data 418 obtained by the first CPS unit 416 during the period of time are stored in a suitable computer readable file 420 on a suitable computer readable medium 422 coupled to the first GPS unit 416.

A second GPS unit 430 is located in a mobile vehicle, such as an automobile 432. The mobile vehicle is of a type that can travel on the roadways 402 in the geographic area 400. During at least some of the period of time that the first GPS unit 416 is collecting data, the second GPS unit 430 is operated to collect second data 440. The automobile 432 is driven on the roadways 402 during at least some of the time that the second GPS unit 430 is collecting data. The data 440 obtained by the second CPS unit 430 in the vehicle 432 as the vehicle 432 is being driven on roadways 402 in the region 400 are indicative of the locations of the vehicle 432 at various times during the period that the second GPS unit 430 is operating. (These data 440 are also indicative of the locations of the roadways 402 since the automobile 432 is being driven on the roadways 402 as the second data 440 are being collected.) The second data 440 collected by the second GPS unit 430 are standard GPS data. The second GPS data 440 obtained by the second GPS unit 430 during the period of time are stored in a second suitable computer readable file 442 on a second suitable computer readable medium 444 coupled to the second GPS unit 430.

After the automobile 432 is driven on the roadways 402, the first standard GPS data 418 can be used to correct the second standard GPS data 440. Since the position of the first GPS unit 416 is known with precision (due to the initial use of the DGPS unit 410), the errors generated in the standard GPS data 418 can be precisely determined for all readings in the first data 418 during the period of time, using the known precise location 405 of the GPS unit 416 as a point of reference. Then, once the errors are determined, they can be used to generate corrections for the second GPS data 440 acquired during the same period of time by the second GPS unit 430 as it was being driven on the roadways 402.

Because DGPS unit 410 was only required to determine the corrected position of the GPS unit 416, it can thereafter be relocated to a second geographic region 400 and used in the same manner described above to allow the collection and correction of data in that other region using a GPS unit simultaneously with the data collection efforts in the first region 400. Likewise, the first GPS unit 416 and the DGPS unit 410 can be relocated after the precise location of the positions of the roadways 402 in the geographic region 400 are obtained. The first GPS unit 416 and the DGPS unit 410 can be relocated to another geographic region and the positions of the roadways in the new geographic region can be obtained in a similar manner, as described above.

An advantage of this embodiment is that cost of establishing a permanent DGPS base station is avoided. Another advantage of this embodiment is that it is suitable for use in regions where it is difficult to obtain continuous DGPS signals. For example, in mountainous regions or regions with many trees and other obstructions, it may be difficult to obtain a DGPS signal continuously from a satellite at many locations while the automobile is being driven on the roadways. In such locations, the present embodiment allows reliable, precise data to be obtained using only one DGPS signal obtained within a radius of approximately 100 miles.

It is to be understood that the forms of the invention as described herewith are to be taken as preferred examples and that various changes in the shape, size and arrangement of parts may be resorted to, without departing from the spirit of the invention or scope of the claims.

We claim:

1. A system for acquiring data for forming a digital database of road geometry in a geographic region, the system comprising:
   a land-based vehicle for traveling on roads;
   a receiver mounted in the land-based vehicle wherein the receiver, when operated during a data gathering sequence, acquires Global Position System (GPS) signals transmitted from a plurality of satellites;
   a demodulator mounted in the land-based vehicle and coupled to the receiver wherein the demodulator receives differential global position system (DGPS) signals from a differential global position system when the demodulator is operated during the data gathering sequence, wherein each GPS signal is corrected by a DGPS signal to create differentially corrected GPS data; and
   a memory that stores each of the corrected GPS data.

2. A system according to claim 1 wherein the receiver and the demodulator are operated whenever the vehicle travels over a road.

3. A system according to claim 1 wherein the differentially corrected GPS data has an accuracy of at least about a radius of ±15 meters from true position.

4. A system according to claim 1 wherein the demodulator receives DGPS signals from an FM transmitter at a known location.

5. A system according to claim 1 wherein the demodulator receives DGPS signals from a satellite.

6. A system according to claim 5 wherein the satellite from which the demodulator receives DGPS signals receives the DGPS signals from a base station at a known location.

7. A system according to claim 1 wherein the demodulator receives DGPS signals from a base station located at a known position.

8. A system according to claim 1 further comprising a display for graphically displaying a representation of the differentially corrected GPS data on a computer workstation.

9. A system according to claim 8 wherein the graphically displayed representation is a map of the road traveled over by the vehicle during the data gathering sequence.

10. A system according to claim 8 wherein the graphically displayed representation includes a plurality of datapoints connected to one another based upon the time the datapoint was measured.

11. A system according to claim 1 further comprising an indicator coupled to the demodulator that confirms the operation of the demodulator during the data gathering sequence.

12. A system according to claim 11 wherein the indicator is an LED located in the vehicle and visible to the operator of the vehicle.

13. A system according to claim 12 wherein the LED is illuminated each time the demodulator correctly receives a DGPS signal.

14. A system for acquiring data for forming a digital database of road geometry in a geographic region using a land-based vehicle equipped to receive Global Position System (GPS) signals while the vehicle is driven on roads in the geographic region, the system comprising:

means for receiving a differential global position system (DGPS) signal located in the land-based vehicle;

means for correcting the GPS signal with the DGPS signal to provide corrected geographic position data; and     a storage device for continuously storing the corrected geographic position data;

wherein the means for receiving a DGPS signal comprises an antenna coupled to the vehicle and a demodulator coupled to the antenna.

15. A system according to claim 14 wherein the means for correcting comprises a receiver located in the vehicle coupled to the demodulator wherein the receiver and demodulator can communicate with one another.

16. A system for acquiring data for forming a digital database of pathway geometry in a geographic region, the system comprising:

a vehicle for traveling along pathways in the geographic region of interest;

a receiver mounted in the vehicle wherein the receiver, when operated during a data gathering sequence, acquires Global Position System (GPS) signals transmitted from a plurality of satellites;

a demodulator mounted in the vehicle and coupled to the receiver wherein the demodulator receives a differential global position system (DGPS) signal from a differential global position system when the demodulator is operated during the data gathering sequence, wherein each GPS signal is corrected by a DGPS signal to generate differentially corrected GPS data; and     a memory that stores each of the differentially corrected GPS data.

17. A method for acquiring data for forming a digital database of road geometry in a geographic region, the method comprising the steps of:

providing a GPS receiver and a DGPS demodulator coupled to the GPS receiver on-board a land-based vehicle;

driving the vehicle on a road in the geographic region;

operating the GPS receiver and DGPS demodulator while traversing the road in the geographic region with the vehicle;

obtaining Global Position System (GPS) signals with the GPS receiver;

obtaining differential global position system (DGPS) signals with the DGPS demodulator;

correcting the GPS signals with the DGPS signals to provide corrected GPS data; and     storing the corrected GPS data.

18. A method according to claim 17 further comprising the step of graphically displaying on a computer workstation a representation of the corrected GPS data.

19. A method according to claim 17 wherein the step of obtaining the DGPS signals with the DGPS demodulator comprises receiving FM signals representing the DGPS signals from an FM transmitter at a known location.

20. A method according to claim 17 wherein the step of obtaining the DGPS signals with the DGPS demodulator comprises receiving the DGPS signals from a satellite.

21. A method according to claim 17 wherein the step of obtaining the DGPS signals with the DGPS demodulator comprises receiving the DGPS signals from a base station at a known location.

22. A method according to claim 17 further comprising the step of verifying the correct operation of the demodulator.

23. A method according to claim 22 wherein the step of verifying comprises illuminating an indictor each time the DGPS demodulator receives a DGPS signal.

24. A method according to claim 17 wherein the corrected GPS data have an accuracy of about ±15 meters.

25. A method according to claim 17 further comprising the step of graphically displaying on a computer workstation a representation of the corrected GPS data.

26. A method according to claim 25 wherein the step of graphically displaying the representation comprises the steps of transmitting the stored corrected GPS data to a site remote from the vehicle, converting the stored corrected GPS data into arc/info signals and transmitting the arc/info signals back to the vehicle where the arc/info signals are graphically displayed.

27. A method according to claim 26 wherein the arc/info signals are graphically displayed as data points connected together based upon the time each datapoint was collected.

28. A method according to claim 26 further comprising the step of selecting nodes on the display.

29. A method of acquiring data for developing a digital database of roadway geometry for roadways and intersections in a selected geographic region, comprising the steps of:

moving a portable DGPS unit to at least one position in said selected geographic region;

operating said portable DGPS unit in conjunction with at least one standard GPS unit to acquire first data indicative of a precise position of said portable DGPS unit in said selected geographic region during a first period of time;

driving a mobile vehicle on roadways in said selected geographic region;

during a second period of time, operating a standard GPS unit located in said mobile vehicle to obtain second data indicative of positions of said mobile vehicle on the roadways during said step of driving;

using said first data to correct said second data to obtain third data indicative of precise positions of said mobile vehicle on said roadways,     whereby said third data are used to develop a digital database of roadway geometry including roadways and intersections for said selected geographic region.

30. The method of claim 29 wherein said step of moving a portable DGPS unit to at least one position further comprises:

locating said portable DGPS unit in said mobile vehicle and relocating said DGPS unit to various positions in said selected geographic region while said mobile vehicle is being driven on roadways in. said selected geographic region during said second period of time such that said first period of time and said second period of time overlap at least in part.

31. The method of claim 29 wherein the step of using said first data is performed as said vehicle is being driven on roadways in said selected geographic region during said second period of time.

32. The method of claim 29 wherein said DGPS unit is located in said mobile vehicle and wherein said step of operating said portable DGPS unit is performed during at least a portion of said second period of time while said mobile vehicle is being driven on roadways in said selected geographic region.

33. The method of claim 29 further comprising the step of:

operating a second standard GPS unit at said precise location during at least a portion of said second period of time to obtain fourth data;

and wherein said step of using said first data includes the step of:

using said fourth data in conjunction with said first data to correct said second data.

34. The method of claim 29 further comprising the step of:

relocating said portable DGPS unit to another selected geographic region after obtaining said second data indicative of positions of roadways in said geographic region.

35. A system for acquiring geographic data for forming a digital database of road geometry in a geographic region, the system comprising:

a land-based vehicle for traveling on roads;

a receiver mounted in the land-based vehicle wherein the receiver, when operated during a data gathering sequence, acquires Global Position System (GPS) signals transmitted from a plurality of satellites;

a demodulator for receiving at least one differential global position system (DGPS) signal from a differential global position system wherein each GPS signal is corrected by the at least one DGPS signal to create differentially corrected GPS data;

a memory that stores each of the corrected GPS data; and a computer for creating the digital database from the corrected GPS data.

36. A system according to claim 35 further comprising a second receiver which is coupled to the demodulator wherein both the demodulator and second receiver are located at a stationary site.

37. A system according to claim 36 wherein the corrected GPS data is used to correct the GPS signals acquired by the second receiver.

38. The system of claim 35 wherein the demodulator is located in the land-based vehicle and coupled to the receiver.

39. The system of claim 38 wherein the demodulator is continuously operated during the data gathering sequence and receives a plurality of DGPS signals.

40. The system of claim 35 wherein the demodulator is located at a stationary site to form a portable base station.

41. The system of claim 40 wherein the demodulator only receives one DGPS signal and all of the GPS signals acquired by the second receiver are corrected by the one DGPS signal.

42. A method for acquiring data for forming a digital database of road geometry in a geographic region, the method comprising the steps of:

receiving at least one Differential Global Position (DGPS) signal with a demodulator located in a land-based vehicle;

receiving a plurality of Global Position System (GPS) signals with a receiver located in the land-based vehicle while the land-based vehicle is driven on at least one road in the geographic region;

generating differentially corrected GPS data by correcting the received GPS signals with the at least one DGPS signal;

storing the corrected GPS data in memory; and using the stored corrected GPS data to create the digital database.

43. A method according to claim 42 further comprising the step of continuously operating the GPS receiver and DGPS demodulator as the land-based vehicle is driven on at least one road in the geographic region.

* * * * *